United States Patent Office — 3,746,724, Patented July 17, 1973

3,746,724
3-GUANIDINOALKYL-THIOPHENES
Lincoln Harvey Werner, Summit, and Neville Finch, West Orange, N.J., assignors to Ciba-Geigy Corporation, Ardsley, N.Y.
No Drawing. Continuation-in-part of application Ser. No. 28,029, Apr. 13, 1970. This application Jan. 26, 1971, Ser. No. 109,957
Int. Cl. A61k 27/00; C07d 65/12
U.S. Cl. 260—329 AM                         6 Claims

ABSTRACT OF THE DISCLOSURE 3-guanidinoalkyl-thiophenes, e.g. those of the formula

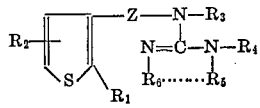

$R_{1,2}$=H, alkyl or halogen
$R_{3,4}$=H or alkyl
$R_{5,6}$=H, alkyl or alkylene
Z is a straight or branched alkylene of up to 4 carbon atoms.

and salts thereof are antihypertensives.

CROSS-REFERENCE TO RELATED APPLICATION

This is a continuation-in-part of application Ser. No. 28,029, filed Apr. 13, 1970.

BACKGROUND OF THE INVENTION

According to Walton et al. (U.S. Pat. No. 3,242,194), antihypertensive 2-thenylguanidines can be "prepared by the reaction of a thenylamine or a salt thereof with an S-substituted isothiourea or a salt thereof." Said 2-thenylguanidines are, in contrast to guanethidine, rather short-acting depressants of the "sympathetic nerve function" and "dosing two or three times a day is usually desirable." Said teaching of Walton et al. cannot be applied to the preparation of corresponding 3-thenylguanidines, because 3-thenylamines are not available according to the methods used in the preparation of 2-thenylamines.

According to the present invention, new 3-guanidino-alkyl-thiophenes (including 3-thenylguanidines) are provided, which surprisingly exhibit outstanding hypotensive effects in the anesthetized normotensive dog, as well as in the unanesthetized renal hypertensive dog. More surprising, said effects are of the desired order of duration. Thus, the 3-thenylguanidines of the present invention are shorter acting than guanethidine, but longer acting than the 2-thenylguanidines of Walton et al.

SUMMARY OF THE INVENTION

The present invention concerns and has for its object the provision of new 3-guanidinoalkyl-thiophenes or salts thereof, more particularly of those corresponding to Formula I

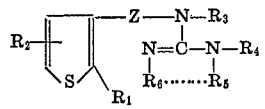

wherein each of $R_1$ and $R_2$ is hydrogen, lower alkyl or halogeno, each of $R_3$ and $R_4$ is hydrogen or lower alkyl, $R_5$ and $R_6$ separately are hydrogen or lower alkyl or, when taken together, lower alkylene separating the adjacent nitrogen atoms by at least 2 carbon atoms and Z is a straight or branched alkylene of up to 4 carbon atoms, or of therapeutically useful acid addition salts thereof, as well as of corresponding pharmaceutical compositions and of methods for the preparation and application of these products. Said products are useful antihypertensive agents in the treatment or management of the various forms of hypertension.

DESCRIPTION OF THE PREFERRED EMBODIMENT

The lower alkyl radicals $R_1$ to $R_6$ primarily represent methyl, but also, for example, ethyl, n- or i-propyl or -butyl. A lower alkylene radical $R_5+R_6$ is preferably 1,2-ethylene or 1,3-propylene, but also, for example, 1,2-propylene, 1,2-, 1,3-, 1,4- or 2,3-butylene. A halogen atom $R_1$ or $R_2$ is primarily chloro or bromo, but also, for example, fluoro. The alkylene radical Z represents preferably methylene or ethylidene, but also, for example, one of the alkylene radicals mentioned for $R_5+R_6$. The term "lower," referred to above and hereinafter in connection with organic radicals or compounds respectively, defines such with up to 7, preferably up to 4 carbon atoms.

Salts of the 3-guanidinoalkyl-thiophene are preferably therapeutically useful acid addition salts, for example, those derived from inorganic acids, such as strong metalloidic acids, for example, hydrohalic, e.g. hydrochloric, hydrobromic, sulfuric, phosphoric, nitric or perchloric acid, or organic acids, such as carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydrobenzoic, salicyclic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic or cyclohexylsulfamic acid; methionine, tryptophan, lysine or arginine.

The compounds of the invention exhibit valuable pharmacological properties, especially hypotensive and antihypertensive effects. This can be demonstrated in animal tests, using advantageously mammals, such as dogs, as test objects. The compounds of the invention can be applied enterally or parenterally, for example, orally (or directly into the lumen of the small intestine) or intravenously, for example, within gelatin capsules or in the form of aqueous solutions or suspensions respectively. The applied dosage may range between about 0.5 and 50 mg./kg./day, preferably between about 1 and 10 mg./kg./day, advantageously at about 3 mg./kg./day. The lowering effect on the blood pressure is observed either in the anesthetized normotensive dog after i.v. drug administration or in the unanesthetized, renal hypertensive dog after oral drug administration, as described, for example, by A. J. Plummer in Medicinal Chemistry VI (1967), Antihypertensive Agents, page 67 (Academic Press Inc., N.Y.). Accordingly, the compounds of the invention are useful antihypertensive agents, for example in the treatment or management of primary or secondary hypertension, e.g. essential or renal hypertension. They are also useful intermediates in the preparation of other valuable products, especially of pharmacologically active agents.

Particularly useful are the compounds of Formula I, in which each of $R_1$ and $R_2$ is hydrogen, alkyl or halogen, each of $R_3$ and $R_4$ is hydrogen, $R_5$ and $R_6$ separately are hydrogen or alkyl or, when taken together alkylene separating the adjacent nitrogen atoms by at least 2 carbon atoms, said alkyl or alkylene groups contain up to 4 carbon atoms and n is an integer from 1 to 3, or therapeutically useful acid addition salts thereof.

Especially valuable are compounds of Formula II

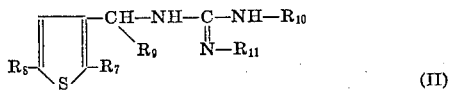
(II)

wherein each of $R_7$ and $R_8$ is hydrogen, methyl, chloro or bromo, each of $R_9$, $R_{10}$ and $R_{11}$ is hydrogen or methyl or $R_{10}$ and $R_{11}$ together represent 1,2-ethylene, more particularly the 1-(3-thienyl)-2,3-dimethylguanidine, or therapeutically useful acid addition salts thereof, which exhibit in the renal hypertensive dog a high order of antihypertensive effects, lasting about one day.

The compounds of the invention are prepared according to methods known for the preparation of substituted guanidines. For example, the process for their preparation consists in:

(a) reacting a corresponding 3 - aminoalkyl - thiophene with a corresponding cyanamide, 1-guanylpyrazole, guanidine or, advantageously, an etherified pseudourea or thiopseudourea or (b) ammono- or aminolyzing a corresponding thienyl-(3)-alkylcyanamide, -urea or -thiourea or, advantageously, an O- or S-ether of the corresponding pseudoureas or (c) reducing a thienyl-(3)-alkanoylguanidine and, if desired, converting a resulting compound into another compound of the invention.

Ethers of the pseudoureas mentioned under items (a) and (b) are, for example, the lower alkyl ethers, such as the methyl, ethyl, propyl or butyl ethers. The other reactants mentioned are unsubstituted or correspondingly substituted by $R_1$–$R_6$, provided that both the 3-aminoalkyl-thiophene mentioned under (a) and the aminolyzing agent mentioned under (b) contain at least one hydrogen atom bound to nitrogen. The 1-guanylpyrazoles may also contain substituents, besides those in the guanyl group, for example, lower alkyl in the 3- and/or 5-position.

The reduction according to item (c) can be performed with the use of simple or complex light metal hydrides, such as borohydrides or, preferably, alkali metal or alkaline earth metal aluminum hydrides, e.g. lithium, sodium or magnesium aluminumhydride. If necessary, activators, such as aluminum chloride, may be used in said reduction.

The compounds of the invention so obtained can be converted into each other according to methods known per se. For example, unsubstituted guanidines can be substituted in the guanidino group by aminolyzing them with mono- or di-lower alkylamines analogous to reaction (b). Furthermore, the compounds of the invention are obtained in the free form or in the form of their salts, depending on the conditions under which the above process is carried out. A resulting free base can be converted into a corresponding acid addition salt, for example by reacting it with an inorganic or organic acid, preferably a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optional antipodes, for example, by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmopsheric pressure. For example, any generated mineral or sulfonic acid may be neutralized with inorganic or organic bases, such as alkali or alkaline earth metal hydroxides, carbonates or bicarbonates or nitrogen bases, such as tri-lower alkylamines or pyridine.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in the reaction according to item (a) the cyanamide may be formed in situ from a nitroso-guanidine, e.g. methylcyanamide from 1-nitroso-3-methylguanidine. The ammonia, primary or secondary amine used according to item (b) may also be released during the reaction from corresponding salts or addition compounds, such as ammonium sulfate, methylammonium acetate or hexamethylenetetramine. Preferably one of the reactants mentioned under (a) and (b) is used in the form of its salt, which especially is derived from an inorganic acid, such as a hydrohalic, phosphoric, nitric or advantageously sulfuric acid. Also metal salts may be used, especially those from cyanamides, which advantageously are alkali or alkaline earth metal salts.

The starting material mentioned under items (b) and (c) is new and is considered as additional subject matter of the present invention. It can be prepared from corresponding 3-alkylthiophenes by halogenation with an N-halogeno-succinimide, advantageously brominated with N-bromosuccinimide. The resulting 3-($\alpha$-halogenoalkyl)-thiophene is then reacted either with ammonia, $R_3$—$NH_2$ or, advantageously, an alkali metal (e.g. potassium) phthalimide, and the resulting N-substituted phthalimide subjected to hydrolysis or hydrazinolysis. Said 3-($\alpha$-halogenoalkyl)-thiophenes can also be obtained from 3-alkanoyl-thiophenes by reduction with simple or complex light metal hydrides and the resulting alcohols esterified with reactive derivatives of the corresponding acids, such as thionyl or phosphorus halides or oxyhalides. The resulting 3 - ($\alpha$ - halogenoalkyl) - thiophenes can also be reacted with alkali metal cyanides and the resulting nitriles reduced, for example, with catalytically activated hydrogen, e.g. hydrogen in the presence of Raney nickel, or with said complex light metal hydrides, e.g. lithium aluminum hydride, in order to obtain 3 - ($\beta$-aminoalkyl)-thiophenes. The former 3 - ($\alpha$ - aminoalkyl)-thiophenes can also be obtained by reduction of the oximes derived from said 3-alkanoyl-thiophenes, e.g. by catalytic hydrogenation. The resulting 3 - ($\alpha$- or $\beta$-aminoalkyl)-thiophenes may be converted into their diazonium salts according to conventional methods, e.g. by reacting them with sodium nitrite under acidic conditions, and the resulting diazonium salts hydrolyzed by raising the temperature of the aqueous solutions thereof until nitrogen evolves, to yield the corresponding 3-($\alpha$- or $\beta$-hydroxyalkyl)-thiophenes. These may be reacted with thionyl or phosphorus halides as described above, the resulting halides reacted with alkali metal cyanides and the nitriles obtained reduced as shown above, in order to yield 3-($\gamma$- or $\delta$ - aminoalkyl)-thiophenes. Resulting primary amines may be converted into the corresponding secondary amines by reacting them with reactive esters of $R_3$—OH, for example, such as a strong mineral or sulfonic acid, such as a hydrohalic acid, e.g. hydrochloric, hydrobromic or hydriodic acid, sulfuric acid or a lower alkane or benzene sulfonic acid, e.g. methane, ethane or p-toluene sulfonic acid. The resulting 3-aminoalkyl-thiophenes can then be converted into the starting material mentioned under item (b), for example, by reacting them with cyanogen halides, isocyanates or isothiocyanates and, if desired, etherifying resulting ureas or thioureas with reactive esters of alkanols, e.g. those mentioned above, in order to obtain the O- or S-alkyl-pseudoureas.

The starting material mentioned under item (c) can be prepared by hydrolyzing the above-mentioned nitriles with strong acids or alkalies, e.g. sulfuric acid or potassium hydroxide in aqueous glycols, to the corresponding thienyl - (3) - alkanoic acids or their salts, converting them into their reactive functional derivatives, e.g. the halides thereof, for example, by reacting the acids with thionyl or phosphorus halides and condensing the resulting acid halides with the corresponding guanidines containing at least one hydrogen atom bound to nitrogen. Thienyl - 3 - carboxylic acids can be prepared from the above-mentioned primary 3 - ($\alpha$ - hydroxyalkyl) - thiophenes, i.e. 3 - hydroxymethylthiophenes, by oxidation, for example, with the use of heavy metal oxides, acids or their salts, such as chromium trioxide, chromic or permanganic acid or potassium permanganate.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageous-fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

EXAMPLE 1

The mixture of 6.78 g. of 3-thenylamine, 8.34 g. of 2-methyl - 2 - thiopseudourea hemisulfate and 65 ml. of water is heated to 100° for 6 hours while stirring, and stirring is continued for 5 hours at room temperature. After standing for 2 days at room temperature, the mixture is evaporated under reduced pressure, the residue triturated with ethanol and recrystallized for methanol-ethanol, to yield the 3-thenylguanidine hemisulfate of the formula

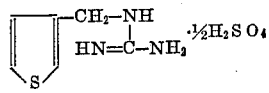

melting at 197–198°.

The starting material is prepared as follows: To the stirred and refluxing mixture of 50 g. of 3-methylthiophene, 150 ml. of benzene and 1 g. of benzoyl peroxide, the mixture of 81.2 g. of N-bromo-succinimide and 1 g. of benzoyl peroxide is added during 12 minutes and the mixture stirred for 4 minutes longer. It is cooled in an ice bath, the precipitate formed filtered off, the residue washed with benzene and the filtrate evaporated. The residue is distilled and the fraction boiling at 68–77°/2.2 mm. Hg collected, to yield the 3-thenyl bromide.

The solution of 5 g. thereof in 5 ml. of dimethylformamide is added dropwise to the mixture of 5.7 g. of potassium phthalimide and 20 ml. of dimethylformamide while stirring under nitrogen. After stirring overnight at room temperature, 75 ml. of chloroform are added and the mixture poured onto 100 ml. of water. The organic layer is separated and the aqeuous phase extracted with chloroform. The combined organic solutions are washed with 80 ml. of 2 N aqueous sodium hydroxide and water, dried, filtered, evaporated under reduced pressure and the residue triturated with diethyl ether, to yield the N-(3-thenyl)-phthalimide, melting at 130–132°.

The mixture of 85.4 g. thereof, 50 ml. of hydrazine hydrate and 1.5 liter of methanol is refluxed for 3½ hours while stirring, during which time it is diluted with another liter of methanol. It is cooled, acidified with concentrated hydrochloric acid to a pH=2 and again refluxed for 1½ hours. After cooling, it is filtered, the residue washed with methanol and the filtrate evaporated under reduced pressure. The residue is taken up in water, the mixture filtered, the filtrate made basic with 6 N aqueous sodium hydroxide and saturated with sodium carbonate. The mixture is extracted with diethyl ether, the extract dried, filtered, evaporated, the residue distilled and the fraction boiling at 65–67°/3 mm. Hg collected, to yield the 3-thenylamine.

EXAMPLE 2

To 12 g. of 1-(3-thenyl)-2,3-dimethyl-2-thiopseudourea, 10% sulfuric acid is added while cooling until a pH=4.5 is reached. Hereupon 60 ml. of 40% aqueous methylamine are added followed by 60 ml. of methanol and the mixture is refluxed for 20 hours under nitrogen. It is evaporated under reduced pressure, the residue triturated with isopropanol and recrystallized from methanol-isopropanol, to yield the 1-(3-thenyl)-2,3-dimethylguanidine hemisulfate of the formula

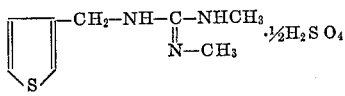

melting at 271–272° with decomposition; its hemihydrate melts at 262° (dec.).

The starting material is prepared as follows: To the solution of 11.3 g. of 3-thenylamine in 75 ml. of diethyl ether, 7.3 g. of methylisothiocyanate in 25 ml. of diethyl ether are added during 5 minutes while stirring. After 2 hours, the supernatant solution is decanted off, the residue washed with diethyl ether and the washings again decanted off, to yield the 1-(3-thenyl)-3-methylthiourea, melting at 68–71°.

The mixture of 18.6 g. thereof, 12.5 ml. of methyl iodide and 100 ml. of methanol is refluxed for 2 hours and evaporated under reduced pressure. The residue is recrystallized from isopropanol, to yield the 1-(3-thenyl)-2,3-dimethyl - 2 - thiopseudourea hydroiodide melting at 146–147°. It is taken up in water, 20 g. of sodium carbonate are added and the mixture extracted with diethyl ether. The extract is dried, filtered and evaporated, to yield the corresponding free base.

EXAMPLE 3

The mixture of 6.78 g. of 3-thenylamine, 9.9 g. of 2-methylmercapto-imidazoline hemisulfate and 65 ml. of water is heated to 100° for 6 hours while stirring and allowed to stand overnight at room temperature. It is evaporated under reduced pressure, the residue taken up in hot methanol, the solution filtered and the filtrate diluted with isopropanol. The precipitate formed after cooling in ice is filtered off, the residue triturated with ethanol and again recrystallized from methanol-isopropanol, to yield the 2-(3-thenyl-amino)-2-imidazoline [1-(3-thenyl)-2,3-ethyleneguanidine] hemisulfate of the formula

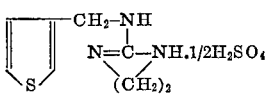

melting at 183–189°.

EXAMPLE 4

To 10 g. of 1 - (2,5-dichloro-3-thenyl)-2,3-dimethyl-2-thiopseudourea, 10% sulfuric acid is added until the pH=5 is reached. The mixture is combined with 60 ml. of 40% aqueous methylamine and 100 ml. of methanol, and the whole is stirred at 90° for 18 hours and 1 hour refluxed under nitrogen. The mixture is evaporated under reduced pressure, the residue triturated with isopropanol and recrystallized from water, to yield the 1-(2,5-dichloro-3 - thenyl)-2,3-dimethylguanidine hemisulfate of the formula

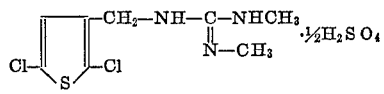

melting at 280° with decomposition.

The starting material is prepared as follows: The mixture of 10 g. of 2,5-dichloro-3-thenyl chloride, 7 g. of hexamethylene-tetramine and 80 ml. of chloroform is stirred for 4 hours at 45° and evaporated under reduced pressure, to yield the 1-(2,5-dichloro-3-thenyl)-hexamethylenetetrammonium chloride melting at 205–207° with decomposition.

The mixture of 10.6 g. thereof, 40 ml. concentrated hydrochloric acid and 50 ml. of methanol is refluxed for 50 minutes, concentrated at normal pressure and evaporated under reduced pressure. The residue is taken up in water, the mixture made basic with 6 N aqueous sodium hydroxide and saturated with sodium carbonate. It is extracted with diethyl ether, the extract dried, filtered, evaporated and the residue distilled and the fraction boiling at 90–91°/1.7 mm. Hg collected, to yield the 2,5-dichloro-3-thenylamine.

The mixture of 10 g. thereof, 4 g. of methylisothiocyanate and 75 ml. of diethyl ether is stirred for 1½ hours at room temperature and allowed to stand overnight. The precipitate formed on scratching is filtered off and washed with diethyl ether, to yield the 1-(2,5-dichloro-3-thenyl)-3-methylthiourea, melting at 98–100°.

The mixture of 11 g. of thereof, 5.4 ml. of methyl iodide and 50 ml. of methanol is refluxed for 2 hours and evaporated under reduced pressure. The residue is taken up in the minimum amount of hot isopropanol, the solution cooled to room temperature, filtered and the filtrate cooled in ice. The precipitate formed is washed with cold isopropanol and dried under reduced pressure, to yield the 1 - (2,5-dichloro-3-thenyl)-2,3-dimethyl-2-thiopseudourea hydroiodide melting at 118–119°. It is taken up in water, the solution saturated with sodium carbonate and extracted with diethyl ether. The extract is dried, filtered and evaporated, to yield the corresponding free base.

EXAMPLE 5

Preparation of 10,000 tablets each containing 50.0 mg. of the active ingredient:

| Formula: | G. |
|---|---|
| 1-(3-thenyl)-2,3-dimethylguanidine hemisulfate | 500.0 |
| Lactose | 1,706.0 |
| Corn starch | 90.0 |
| Polyethylene glycol 6,000 | 90.0 |
| Talcum powder | 90.0 |
| Magnesium stearate | 24.0 |
| Purified water, q.s. | |

Procedure

All the powders are passed through a screen with openings of 0.6 mm. Then the drug substance, lactose, talcum, magnesium stearate and half of the starch are mixed in a suitable mixer. The other half of the starch is suspended in 45 ml. of water and the suspension added to the boiling solution of the polyethylene glycol in 180 ml. of water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

EXAMPLE 6

To 6.7 g. of 1 - [1-(3-thienyl)-ethyl]-2,3-dimethyl-2-thiopseudourea, 1.6 g. of sulfuric acid is added and the pH adjusted to 6.2 with a small amount of aqueous sodium hydroxide. Hereupon 30 ml. of 40% aqueous methylamine are added, followed by 50 ml. of methanol and the mixture is refluxed for 20 hours under nitrogen. It is evaporated under reduced pressure, the residue triturated with isopropanol and recrystallized from methanol-isopropanol, to yield the 1-[1-(3-thienyl)-ethyl]-2,3-dimethylguanidine hemisulfate of the formula

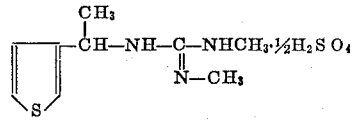

melting at 196–200° with decomposition.

The starting material is prepared as follows: To the mixture of 3.6 g. of lithium wire and 100 ml. of diethyl ether is added 34.4 g. of butyl bromide at a rate to maintain the temperature at −10°. The reaction mixture is allowed to warm up to 0–10° for 2 hours. The unreacted lithium is filtered off and the filtrate cooled to −70°, whereupon the solution of 32.6 g. of 3-bromothiophene in 100 ml. of diethyl ether is added. The mixture is stirred for 10 minutes and the solution of 20 g. of N,N'-dimethylacetamide in 50 ml. of diethyl ether is added. The resulting mixture is stirred at −70° for 1 hour, poured over ice, acidified with concentrated hydrochloric acid and the layers separated. The organic layer is dried and evaporated. The residue is distilled under reduced pressure to give the 3-acetylthiophene boiling at 77–90°/2.8 mm. Hg.

The mixture of 5.8 g. thereof, 8.3 g. of O-methyl-hydroxylamine hydrochloride, 25 ml. of pyridine and 40 ml. of ethanol is refluxed for 16 hours. On cooling, the mixture is extracted with chloroform; the chloroform solution is washed with dilute aqueous hydrochloric acid, water and dried. The chloroform solution is evaporated to an oil, being the O-methyl-3-acetylthiophene oxime.

To the mixture of 17.9 g. thereof and 100 ml. of tetrahydrofuran, 300 ml. of a 1 molar solution of diborane in tetrahydrofuran are added at −10°. The resulting mixture is allowed to warm to room temperature and then refluxed for two hours. On cooling, 50 ml. of ethanol are added cautiously, followed by a solution of hydrogen chloride in ethyl acetate until the reacting mixture is acidic. The resulting mixture is evaporated under reduced pressure and the residue partitioned between diethyl ether and water. The aqueous layer is made basic with 6 N aqueous sodium hydroxide and the basic solution extracted with diethyl ether. The ether extract is dried and evaporated to afford as an oil the 3-(1-aminoethyl)-thiophene. To the solution of 6.4 g. thereof in 50 ml. of diethyl ether, 3.7 g. of methylisocyanate in 25 ml. of diethyl ether are added during 5 minutes while stirring. After two hours, the supernatant solution is decanted, the residue washed with diethyl ether and the washings again decanted to yield the 1-[1-(3-thienyl)-ethyl]-3-methylthiourea, melting at 88–90°.

The mixture of 5.7 g. thereof, 3.8 ml. of methyl iodide and 50 ml. of methanol is refluxed for 2 hours and evaporated under reduced pressure. The residue is recrystallized from isopropanol, to yield the 1-[1-(3-thienyl)-ethyl]-2,3-dimethyl-2-thiopseudourea hydroiodide melting at 135–136°. It is taken up in water, 10 g. of sodium carbonate are added and the mixture extracted with diethyl ether. The extract is dried, filtered and evaporated, to yield the corresponding free base.

EXAMPLE 7

The mixture of 3 g. of 3-(2-aminoethyl)-thiophene, 3.3 g. of 2-methyl-2-thiopseudourea hemisulfate and 30 ml. of water is heated to 100° for 6 hours while stirring, and stirring is continued for 5 hours at room temperature. After standing overnight, the mixture is evaporated under reduced pressure, the residue triturated with isopropanol and recrystallized from methanol-ethanol, to afford the 2-(3-thienyl)-ethylguanidine hemisulfate of the formula

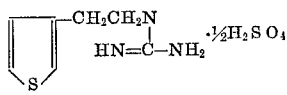

melting at 142–145°.

The starting material is prepared as follows: The solution of 17.7 g. of 3-thienyl bromide in 10 ml. of dimethylformamide is added over a 10 minute period to the mixture of 7.35 g. of sodium cyanide and 50 ml. of dimethylformamide. The reaction temperature rises to about 55° and the mixture is then cooled to about 40° where the temperature is maintained. After the addition, the mixture is heated to 70° for one hour. On cooling, it is poured into 150 ml. of water. The mixture is extracted with diethyl ether, the extract washed with water, dried, filtered and evaporated. The residual oil is distilled under reduced pressure to give the (3-thienyl)-acetonitrile boiling at 82–93°/2 mm. Hg.

To the mixture of 5.55 g. thereof and 40 ml. of tetrahydrofuran is added, dropwise, 60 ml. of a 1 molar solution of diborane in tetrahydrofuran at about 20°. The reacting mixture is allowed to stir at room temperature for 3 hours and is decomposed by the cautious addition of 15 ml. of ethanol and then made acidic by the addition of a solution of hydrogen chloride in ethyl acetate. After stirring for one hour, the solids are collected on a filter, washed with ethyl acetate and dried, to yield the 3-(2-aminoethyl)-thiophene hydrochloride, melting at 210–212°. It is taken up in water, 10 g. of sodium carbonate are added and the mixture extracted with diethyl ether. The extract is dried, filtered and evaporated, to yield the corresponding free base.

EXAMPLE 8

To 7.4 g. of 1-(3-thenyl)-2-methyl-3-ethyl-2-thiopseudourea is added 1.7 g. of concentrated sulfuric acid while cooling and the pH is then adjusted to 6.2 with aqueous sodium hydroxide. Hereupon 25 ml. of 70% aqueous ethylamine are added, followed by 25 ml. of ethanol and the mixture is refluxed for 12 hours in a nitrogen atmosphere. The reaction mixture is evaporated under reduced pressure, the residue triturated with isopropanol and recrystallized from ethanol-methanol, to yield the 1-(3-thenyl)-2,3-diethylguanidine hemisulfate of the formula

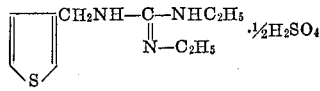

melting at 212–213°.

The starting material is prepared as follows: To the solution of 7 g. of 3-thenylamine in 50 ml. of diethyl ether, 4.8 g. of ethylisothiocyanate in 25 ml. of diethyl ether are added during 5 minutes while stirring. After 2 hours, the supernatant solution is decanted and the oily residue crystallized, to yield the 1-(3-thienyl)-3-ethylthiourea, melting at 98–101°.

The mixture of 8.2 g. thereof, 5 ml. of methyl iodide and 50 ml. of methanol is refluxed for 2½ hours and evaporated under reduced pressure. The residue is recrystallized from isopropanol, to yield the 1-(3-thenyl)-2-methyl-3-ethyl-2-thiopseudourea hydroiodide, melting at 106–107°. It is taken up in water, 10 g. of sodium carbonate are added and the mixture extracted with diethyl ether. The extract is dried, filtered and evaporated, to yield the corresponding free base.

EXAMPLE 9

To 9 g. of 1-[2-(3-thienyl)-ethyl]-2,3-dimethyl-2-thiopseudourea, 10% sulfuric acid is added while cooling, until a pH of 3.5 to 4 is reached. Hereupon 60 ml. of 40% aqueous methylamine are added, followed by 50 ml. of methanol and the mixture is refluxed for 18 hours. The resulting solution is evaporated under reduced pressure, the residue triturated with isopropanol and recrystallized from methanol-isopropanol, to yield the 1-[3-thienyl)-ethyl]-2,3-dimethylguanidine hemisulfate of the formula

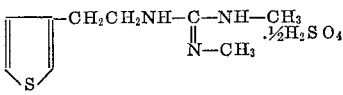

melting at 180–182° with decomposition.

The starting material is prepared as follows: To the solution of 7 g. of 3-(2-aminoethyl)thiophene in 50 ml. of diethyl ether, 4.02 g. of methylisothiocyanate in 25 ml. of diethyl ether are added during 5 minutes while stirring. After 4 hours, the solution is seeded, thereby obtaining the crystalline 1-[2-(3-thienyl)-ethyl]-3-methylthiourea.

The mixture of 9.6 g. thereof, 6.3 ml. of methyl iodide and 60 ml. of methanol is refluxed for 2 hours and evaporated under reduced pressure. The residue is recrystallized from isopropanol, to yield the 1-[2-(3-thienyl)-ethyl]-2,3-dimethyl-2-thiopseudourea hydriodide. It is taken up in water, 10 g. of sodium carbonate are added and the mixture extracted with diethyl ether. The extract is dried, filtered and evaporated, to yield the corresponding free base.

EXAMPLE 10

The mixture of 3.2 g. of 2,5-dimethyl-3-thenylamine, 3.17 g. of 2-methyl-2-thiopseudourea hemisulfate and 30 ml. of water is heated to 100° for 6 hours. After standing overnight at room temperature, isopropanol is added to precipitate product. It is recrystallized from methanol, to yield the 2,5-dimethyl-3-thenyl-guanidine hemisulfate of the formula

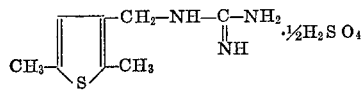

melting at 200–204°.

The starting material is prepared as follows: To the solution of 22.4 g. of 2,5-dimethylthiophene in 50 ml. of glacial acetic acid, the solution of 20.2 g. of chloromethyl methyl ether in 10 ml. of glacial acetic acid are added over a 15 minute period at 0–3°. The resulting solution is stirred for ½ hour and then allowed to warm up to room temperature and stirred for an additional 3 hours. The reaction mixture is poured onto 300 ml. water and extracted with 4 portions of diethyl ether. The combined extracts are washed with water, aqueous sodium bicarbonate, dried, filtered and evaporated. The residual oil is distilled under reduced pressure to afford the 2,5-dimethyl-3-chloromethylthiophene, boiling at 80–90°/2 mm. Hg.

The mixture of 14.9 g. thereof, 17.6 g. of potassium phthalimide and 75 ml. of dimethylformamide is stirred for 20 hours at room temperature. Thereupon 75 ml. of chloroform are added and the resulting mixture poured into water. The layers are separated and the aqueous layer extracted with chloroform. The extract is washed with 1 N aqueous sodium hydroxide and water, dried, filtered and evaporated. The residual solid is recrystallized from isopropanol, to yield the 2,5-dimethyl-3-phthalimidomethylthiophene, melting at 111–112°.

To the mixture of 19.5 g. thereof, 11 ml. of hydrazine hydrate and 500 ml. of methanol is refluxed for 3½ hours. It is cooled, acidified with 20 ml. of concentrated hydrochloric acid and again refluxed for 1½ hours. After cooling, it is filtered, the residue washed with methanol and the filtrate evaporated under reduced pressure. The residue is taken up in water, the mixture filtered, the filtrate made basic with 6 N aqueous sodium hydroxide and saturated with sodium carbonate. The mixture is extracted with diethyl ether, the extract dried, filtered, evaporated, the residue distilled and the fraction boiling at 61–63°/ 1.2 mm. Hg collected, to yield the 2,5-dimethyl-3-thenylamine.

EXAMPLE 11

To 12.2 g. of 1-(2,5-dimethyl-3-thenyl)-2,3-dimethyl-2-thiopseudourea, 10% aqueous sulfuric acid is added until a pH of 4 is reached. Hereupon 75 ml. of 40% aqueous methylamine are added, followed by 75 ml. of methanol and the mixture is refluxed for 20 hours under nitrogen. It is evaporated under reduced pressure, the residue triturated with isopropanol and recrystallized from methanol-isopropanol, to yield the 1-(2,5-dimethyl-3-thenyl)-2,3-dimethylguanidine hemisulfate of the formula

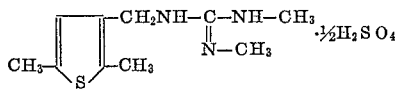

melting at 290° with decomposition.

The starting materials are prepared as follows: To the solution of 10 g. of 2,5-dimethyl-3-thenylamine in 75 ml. of diethyl ether, 5.2 g. of methylisothiocyanate and 25 ml. of diethyl ether are added during 5 minutes while stirring. After 2 hours the solution is seeded, thereby obtaining the crystalline 1-(2,5-dimethyl-3-thenyl)-3-methylthiourea, melting at 81–83°.

The mixture of 13 g. thereof, 7.6 ml. of methyl iodide and 75 ml. of methanol is refluxed for 2 hours and evaporated under reduced pressure. The residue is recrystallized from isopropanol, to yield the 1-(2,5-dimethyl-3-thenyl)-2,3-dimethyl-2-thiopseudourea hydroiodide. It is taken up in water, 10 g. of sodium carbonate are added and the mixture extracted with diethyl ether. The extract is dried, filtered and evaporated, to yield the corresponding free base.

EXAMPLE 12

The mixture of 9.7 g. of 2-bromo-3-thenylamine, 7.9 g. of trimethylisothiouronium chloride and 160 ml. of isopropanol is refluxed for 16 hours. It is evaporated under reduced pressure, the residual oil taken up in 25 ml. of water, made basic with 20 ml. of 50% aqueous sodium hydroxide and extracted with toluene. The extract is evaporated under reduced pressure and the residue taken up in 100 ml. of isopropanol. The resulting solution is neutralized by the addition of 2.59 g. of 94.5% aqueous sulfuric acid. The solution is cooled, the solids formed are collected on a filter and washed with cold isopropanol. Recrystallization from isopropanol-water affords the 1-(2 - bromo - 3-thenyl)-2,3-dimethylguanidine hemisulfate monohydrate of the formula

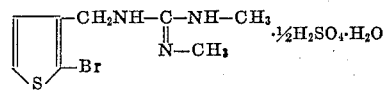

melting at 277°.

We claim:
1. A 3-guanidinoalkyl-thiophene of the formula

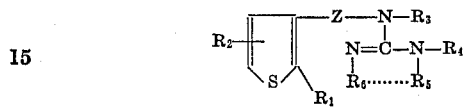

wherein each of $R_1$ and $R_2$ is hydrogen, lower alkyl or halogeno, each of $R_3$ and $R_4$ is hydrogen or lower alkyl, $R_5$ and $R_6$ separately are hydrogen or lower alkyl or, when taken together, lower alkylene of up to 4 carbon atoms separating the adjacent nitrogen atoms by at least 2 carbon atoms and Z is a straight or branched alkylene chain of up to 4 carbon atoms, or a therapeutically useful acid addition salt thereof.

2. A compound as claimed in claim 1, in which formula each of $R_1$ and $R_2$ is hydrogen, lower alkyl of up to 4 carbon atoms or halogeno, each of $R_3$ and $R_4$ is hydrogen, $R_5$ and $R_6$ separately are hydrogen or lower alkyl of up to 4 carbon atoms separating the adjacent nitrogen atoms by at least 2 carbon atoms and Z is a straight or branched alkylene of up to 3 carbon atoms, or a therapeutically useful acid addition salt thereof.

3. A compound as claimed in claim 1 and corresponding to the formula

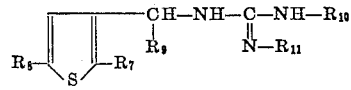

wherein each of $R_7$ and $R_8$ is hydrogen, methyl, chloro or bromo, each of $R_9$, $R_{10}$ and $R_{11}$ is hydrogen or methyl or $R_{10}$ and $R_{11}$ together represent 1,2-ethylene, or a therapeutically useful acid addition salt thereof.

4. A compound as claimed in claim 1 and being the 3-thenylguanidine or a therapeutically useful acid addition salt thereof.

5. A compound as claimed in claim 1 and being the 1-(3-thenyl)-2,3-dimethylguanidine or a therapeutically useful acid addition salt thereof.

6. A compound as claimed in claim 1 and being the 1-(2-bromo-3-thenyl)-2,3-dimethylguanidine or a therapeutically useful acid addition salt thereof.

References Cited

UNITED STATES PATENTS

| 3,242,194 | 3/1966 | Walton, et al. | 260—329 |
| 3,401,201 | 9/1968 | Walton, et al. | 260—566 |
| 3,247,221 | 4/1966 | Augstein, et al. | 260—309.6 |
| 3,330,838 | 7/1967 | Augstein, et al. | 260—309.6 |

OTHER REFERENCES

Smith: Open-Chain Nitrogen Compounds, VI (Benjamin, N.Y., 1965), pp. 254–255, 281–282.

HENRY R. JILES, Primary Examiner

C. M. S. JAISLE, Assistant Examiner

U.S. Cl. X.R.

260—237.65, 256.5 R, 309.6, 326.12 R, 332.2 R, 332.5; 424—229, 251, 273, 274, 275